United States Patent [19]

Iwatsuki et al.

[11] Patent Number: 4,945,481
[45] Date of Patent: Jul. 31, 1990

[54] SYSTEM FOR INTEGRALLY CONTROLLING AUTOMATIC TRANSMISSION AND ENGINE

[75] Inventors: Kunihiro Iwatsuki; Yoshio Shindo, both of Toyota; Kazuhiko Hayashi, Nagoya; Hiroshi Sasaoka, Okazaki; Yukio Hamano, Kobe; Keita Sakurai, Toyota; Fumiaki Izumi, Toyota; Yuji Kashihara, Toyota, all of Japan

[73] Assignee: Toyota Jidosha Kabushiki Kaisha, Japan

[21] Appl. No.: 44,307

[22] Filed: Apr. 30, 1987

[30] Foreign Application Priority Data

May 8, 1986 [JP] Japan ................................. 61-105543
Jul. 7, 1986 [JP] Japan ................................. 61-159402

[51] Int. Cl.<sup>5</sup> ....................... G05D 17/02; G06F 15/50
[52] U.S. Cl. ............................... 364/424.1; 364/431.01; 74/866
[58] Field of Search ............ 364/424.1, 431.05, 431.01, 364/131, 133; 74/866

[56] References Cited

U.S. PATENT DOCUMENTS

| | | | |
|---|---|---|---|
| 4,208,929 | 6/1980 | Heino et al. | 74/731 |
| 4,266,447 | 5/1981 | Heess et al. | 74/858 |
| 4,370,903 | 2/1983 | Stroh et al. | 74/858 |
| 4,403,527 | 9/1983 | Mohl et al. | 74/851 |
| 4,458,560 | 7/1984 | Frank et al. | 74/866 |
| 4,543,934 | 10/1985 | Morita et al. | 123/435 |
| 4,556,955 | 12/1985 | Wright et al. | 364/133 |
| 4,593,581 | 6/1986 | Omitsu | 74/866 |
| 4,610,183 | 9/1986 | Nobumoto et al. | 74/866 |
| 4,688,450 | 8/1987 | Hayashi et al. | 74/866 |
| 4,715,258 | 12/1987 | Shigematsu et al. | 74/866 |
| 4,737,915 | 4/1988 | Hosaka | 74/866 |
| 4,740,898 | 4/1988 | McKee et al. | 364/431.01 |
| 4,819,187 | 4/1989 | Yasue et al. | 364/424.1 |
| 4,825,372 | 4/1989 | Yasue et al. | 364/424.1 |
| 4,838,125 | 6/1989 | Hamano et al. | 364/424.1 |

FOREIGN PATENT DOCUMENTS

| | | |
|---|---|---|
| 0227001 | 12/1984 | European Pat. Off. |
| 0130811 | 1/1985 | European Pat. Off. |
| 55-69738 | 5/1980 | Japan |
| 2042658 | 9/1980 | United Kingdom |
| 2156017 | 10/1985 | United Kingdom |

Primary Examiner—Parshotam S. Lall
Assistant Examiner—Christopher L. Makay
Attorney, Agent, or Firm—Oliff & Berridge

[57] ABSTRACT

In a system for integrally controlling an automatic transmission and an engine, an apparatus for controlling the automatic transmission and an apparatus for controlling the engine are formed separately from each other to reduce size and cost, and to facilitate the mounting of control means onto a vehicle. Further, if trouble occurs in this communication system between the engine control apparatus and the automatic transmission control apparatus countermeasures are properly performed, and a trouble is reduced as much as possible.

9 Claims, 12 Drawing Sheets

FIG.IC
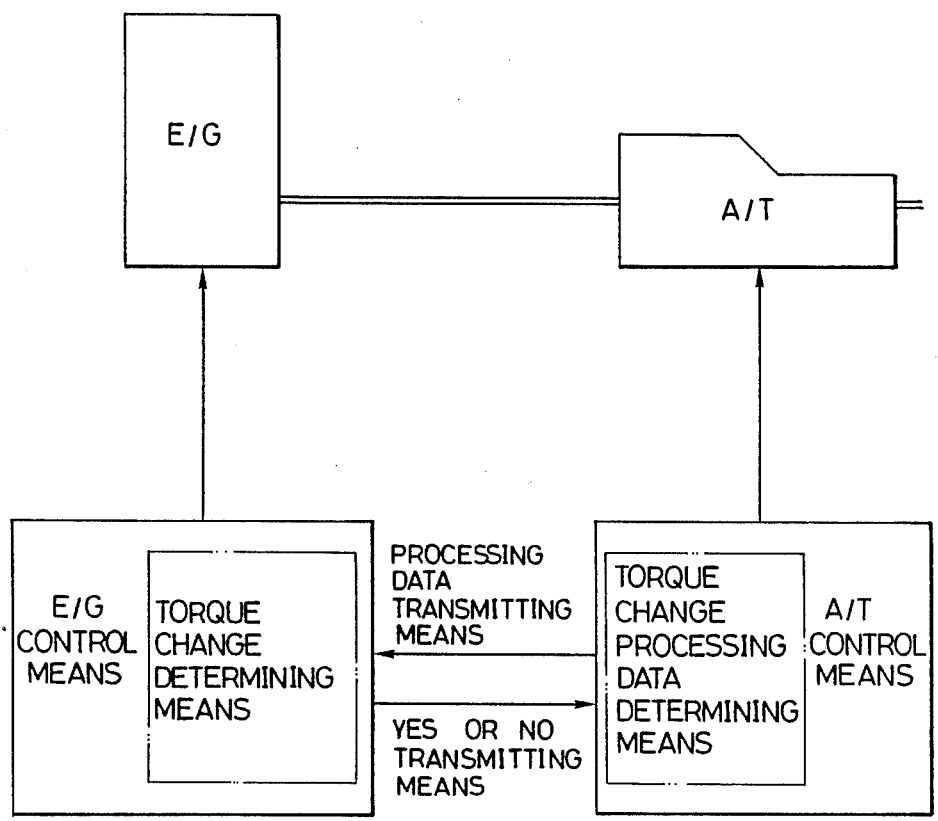

| E/G TORQUE CHANG VALUE (DIGITAL VALUE) | $d_0$ | $d_1$ | $d_2$ | $d_3$ | $d_4$ | $d_5$ | $d_6$ | $d_7$ |
|---|---|---|---|---|---|---|---|---|
| LAG ANGLE VALUE $\triangle$BTDC | 0° | 8° | 12° | 15° | 18° | 20° | 22° | 24° |

| SIGNAL COMMUNICATION LINES \ DIGITAL VALUE | d0 | d1 | d2 | d3 | d4 | d5 | d6 | d7 |
|---|---|---|---|---|---|---|---|---|
| 31 | × | × | × | ○ | × | ○ | ○ | ○ |
| 32 | × | × | ○ | × | ○ | × | ○ | ○ |
| 33 | × | ○ | × | × | ○ | ○ | × | ○ |

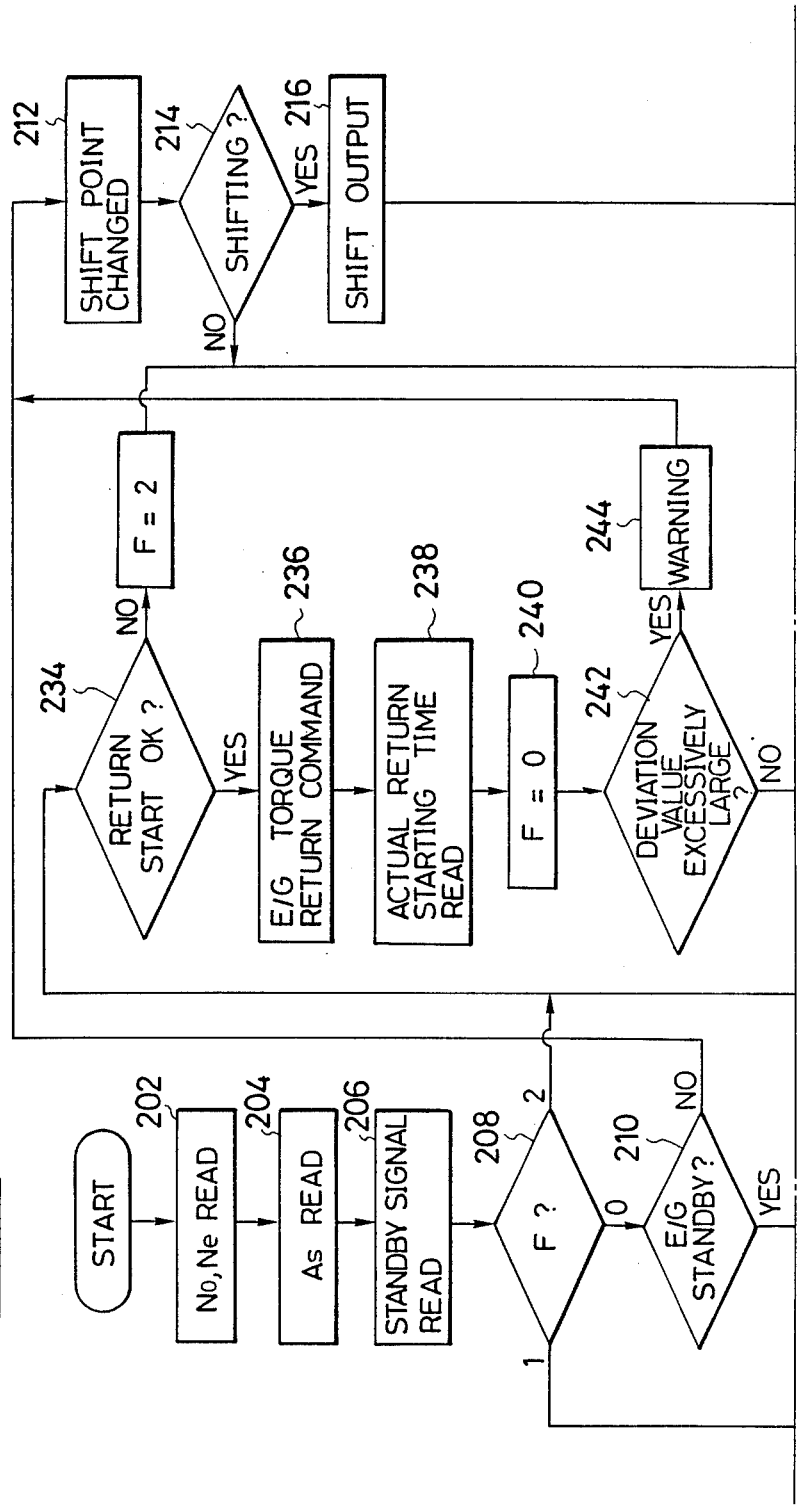

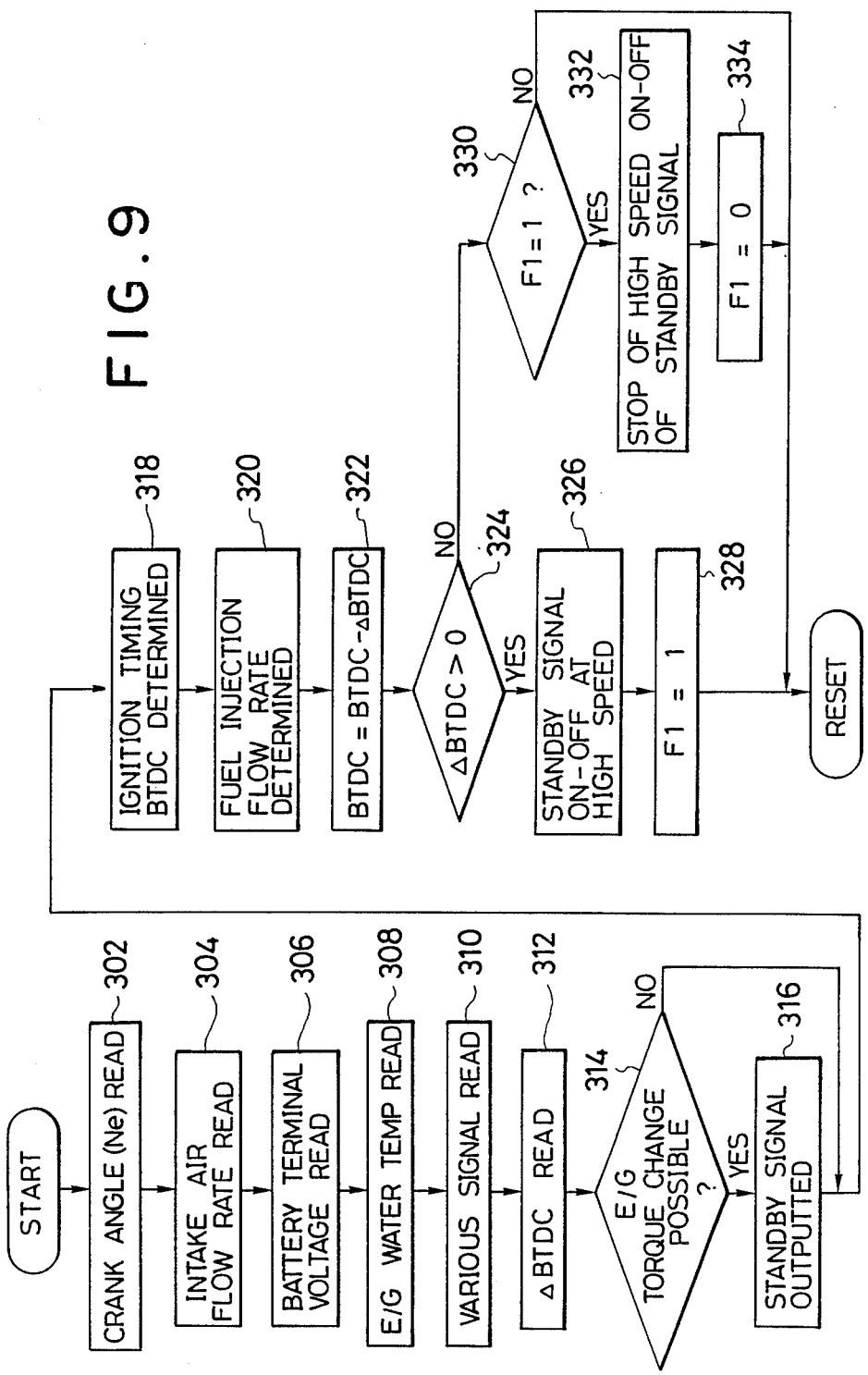

SYSTEM FOR INTEGRALLY CONTROLLING AUTOMATIC TRANSMISSION AND ENGINE

BACKGROUND OF THE INVENTION

This invention relates to a system for integrally controlling an automatic transmission and an engine.

Automatic transmissions comprising gear transmission mechanisms, a plurality of frictionally engaging devices, and hydraulic pressure control devices operated to selectively switch the engagements of the frictionally engaging devices, so that any one of a plurality of gear stages can be achieved in accordance with a preset shift map, are well known in the transmission art.

Furthermore, in vehicle automatic transmission of the type described, various systems are known for integrally controlling an automatic transmission and an engine, wherein engine torque is changed during shifting to obtain satisfactory shift characteristics and durability of the frictionally engaging devices.

When the engine torque is changed during shifting, absorbed energy in the frictionally engaging devices for controlling members in the automatic transmission can be decreased. As a result, the shifting can be completed with low shocks for a short period of time, so that a satisfactory shift feeling can be given to a driver and the durability of the frictionally engaging devices can be improved.

However, in constructing the above-described system, when means for controlling the engine, means for controlling the automatic transmission and further control means for determining processing data including the engine torque change timing and engine torque change value are integrally provided, increased capacity of a computer leads to increased cost and it is disadvantageous to mount the system on a vehicle which has a high limitation in storage space.

Furthermore, adoption of the integrally controlling system may be disadvantageous from the viewpoints of all-around properties or common-purpose properties, because there are vehicles which require no engine torque control.

Now, when these control means are simply formed separately from each other, it is possible that advantages of expanded all-around properties to be obtained from forming these control means separately cannot be utilized so much, the subsequent development and improvement cannot be enhanced smoothly and/or disadvantages from a failsafe viewpoint are presented.

For example, in order to change the engine torque during shifting, it is inevitable to provide means for determining a timing and a change value for the torque change. In this case, the timing and the change value for the torque change should be varied in accordance with the progress of shifting, type of shifting, vehicle speed (shift point) and the like, and moreover, "gradual treatment" should be carried out when the engine torque returns from the changing. As a result, it is desirable to determine the timing and the change value on the side of the automatic transmission control means which grasps the state of shifting best. Incidentally, here, the "gradual treatment" means treatment that the engine torque is not to be abruptly changed in a stepped manner, but is to be gradually increased or decreased.

Further, in the case where the timing and the change value for the torque change are determined on the side of the automatic transmission control means, the determined information must be transmitted to the engine control means. In this case, when chronological changes of characteristics of requirements for the engine torque change are to be transmitted by analog signals, it is necessary to cause the engine control means to share special logic including A/D conversion. As a result, it is desirable to transmit the chronological changes by combination of a plurality of digital signals i.e., digital values. When the chronological changes are to be transmitted by the combination of the plurality of digital signals, the engine torque changes prearranged between the engine control means and the automatic transmission control means can be performed by the combinations of the signals.

However, if the relationship between the digital value and the engine torque change value are not suitably preset, then the engine torque change, particularly, the engine torque change during the gradual treatment is not performed as intended, and shift shocks may increase. For example, as disclosed in Japanese Patent Laid-Open (Kokai) No. 180768/1983, after the ignition timing is retarded by a predetermined angle during shifting to decrease the engine torque, even if the ignition timing is advanced by a little predetermined constant angle per ignition, the engine torque is not returned by degrees.

SUMMARY OF THE INVENTION

The present invention has been developed to obviate the above-described disadvantages and has as its object the provision of a system for integrally controlling an automatic transmission and an engine, wherein the advantages of a separate type system are obtained, yet the disadvantages of such a separate type system are minimized.

According to a first aspect of the present invention, as shown in FIG. 1 (A), the engine control means and the automatic transmission control means are formed separately of each other. Due to this separate formings, individual control means (computers) are made compact in size and small in capacity, whereby mounting of the control means onto a vehicle can be facilitated, thereby realizing lowered costs.

In general, either a manual transmission or an automatic transmission is mounted onto a vehicle. In order to increase the all-around properties of the engine control means, it is requested to use these engine control means with both the vehicle mounted with the manual transmission and the vehicle mounted with the automatic transmission. The automatic transmission control means is applicable only to the vehicle mounted with the automatic transmission, and an engine torque change control during shifting is applicable only to the vehicle mounted with the automatic transmission. Consequently, it is not wasteful to determine the timing and change value for the engine torque change on the side of the automatic transmission control means.

Further, when the vehicles are developed and improved, the groups that, in general, develop and improve the engine control means are separate from the groups that develop and improve the automatic transmission control means. Needless to say, the groups that develop and improve the automatic transmission control means know the behavior of the automatic transmission best. Consequently, when the torque change is performed in accordance with a request from the automatic transmission, it is reasonable that improvement in determining various processing data such as the timing, the change value and the like are performed in the groups that treat the automatic transmission control means. According to the first aspect of the present invention, this processing data determining means is made integral with the automatic transmission control means, so that the above-described developments and improvements can be finely promoted.

Furthermore, processing data, including both the change value and the change timing are transmitted via one communication system. It can be performed, for example, through that change value "zero information" is included in the change value information. With this arrangement, the wiring can be simplified and the probability of malfunctions can be decreased, accordingly.

According to a second aspect of the present invention, as shown in FIG. 1 (B), in performing communications between the engine control means and the automatic transmission control means, values of parameters for changing engine torque, by which the engine torque change values are divided into equal parts, and combination of a plurality of digital signals (digital values) are previously associated with each other, and one of these digital values is transmitted to the engine control means. As a result, the engine control means may change the engine torque by an amount of the value of the parameter associated with the transmitted digital values, so that the engine control means need not share special logics in particular. In this case, the change value of the engine torque itself is varied by one level in response to the change of one level of the transmitted digital value.

As a result, for example, the time duration for maintaining each of the digital values is varied, so that the characteristics of gradual treatment of the torque change can be precisely controlled. More specifically, only if the maintaining time duration of each digital value is varied in accordance with the types of shifting, engine load and the like for example, the optimum characteristics of gradual treatment can be easily obtained.

According to the second aspect of the present invention, as the parameter for changing engine torque, a lag angle value of the ignition timing, a fuel injection flow rate, an exhaust gas value in a variable exhaust gas value control, a superchange value in a variable supercharge pressure control and the like can be taken up. Because these changing parameters are varied, the engine torque can be changed. According to the second aspect of the present invention, the changing parameters for changing the engine torque are not limited in particular. Because the values of the changing parameters and the digital values are previously associated with each other such that the engine torque change value is divided into equal levels, even if any type of the changing parameter is selected, a change of one level of the engine torque value itself is certainly materialized by a change of one level of the digital value.

According to a third aspect of the present invention, as shown in FIG. 1 (C), when the system of the vehicle is considered as a whole, the engine torque control can be carried out more appropriately.

More specifically, when the engine torque change is practically carried out, there are cases where the torque change should be regulated in accordance with the conditions of the exhaust gas temperature, the battery voltage, the cooling water temperature or the like. In this case, the engine control means has an input terminal for performing the above-described regulation in general. Therefore, there is no need for an additional input terminal for performing regulation of the torque change control during shifting. Consequently, although it is reasonable that the automatic transmission control means determines the basic torque change timing and the change value during shifting, it is also reasonable that the engine control means determines whether or not the regulation of torque change should be performed when the vehicle system is considered as a whole. According to the third aspect of the present invention, the engine control means regulates the engine torque change, therefore eliminating the need for additional wirings and input terminals etc. and achieving efficient design and assembly.

According to the third aspect of the present invention, the torque change value, which is one of the processing data determined after the regulation, may be set to zero. Therefore, when the change value is regulated by a request from the engine, it is desirable that the proper change value is slightly lowered in accordance with the request from the engine, however, the general arrangement becomes complicated accordingly. When the torque change value which is determined after the regulation is set to zero, only when a stand-by signal is produced from the engine control means, the automatic transmission control means may calculate the processing data of the torque change as will be described hereunder, so that the system can be simplified in construction.

According to a fourth aspect of the present invention, as shown in FIG. 1 (D), various associations may be made from a failsafe viewpoint. More specifically, the processing data information of the torque change control, which is determined by the automatic transmission control means, is compared with the processing data information, which has been actually carried out, so that it is possible to monitor whether or not the processing data information of the torque change control, which is determined by the automatic transmission control means, has been reliably transmitted to the engine control means via a communication line. As a result, if a trouble occurs in the communication system, the driver can be immediately informed of that trouble by a warning, or countermeasures, such as lowering a shift point of the automatic transmission, are carried out in order to secure the durability of the frictionally engaging devices of the automatic transmission.

In a preferred embodiment of the first to fourth aspects of the persent invention, the processing data determining means detects an engine rotary speed and an automatic transmission output shaft rotary speed to determine the timing of the torque change. With this arrangement, the timing of the torque change can be accurately determined.

BRIEF DESCRIPTION OF THE DRAWINGS

The above objects, features and advantages of the present invention, as well as other objects and advantages thereof, will become more apparent from the description of the invention which follows, taken in conjunction with the accompanying drawings, wherein like reference characters designate the same or similar parts and wherein:

FIGS. 8A–B is the flow chart showing a control flow in an automatic transmission control computer;

FIG. 9 is a flow chart showing control flow in an engine control computer; and

DESCRIPTION OF THE PREFERRED EMBODIMENT

The present invention will be described in detail with reference to the accompanying drawings which illustrate preferred embodiments of the present invention.

Figure 1A:
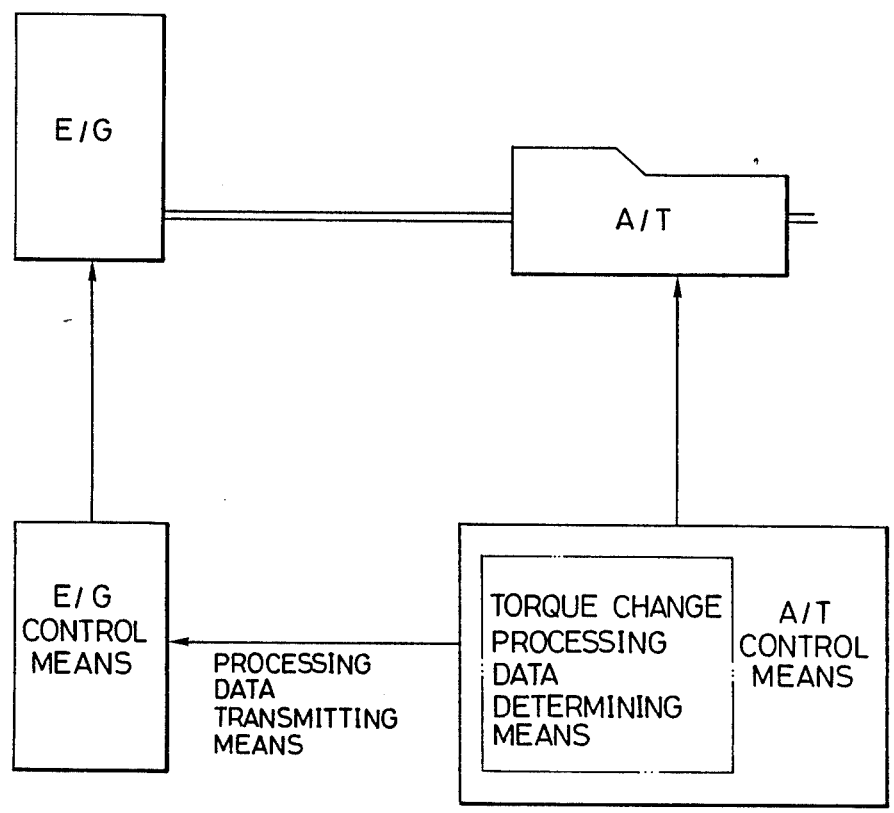
FIGS. 1 (A)–(D) are block diagrams showing the technical illustration of the first to fourth aspects of the present invention, respectively.
Figure 1B:
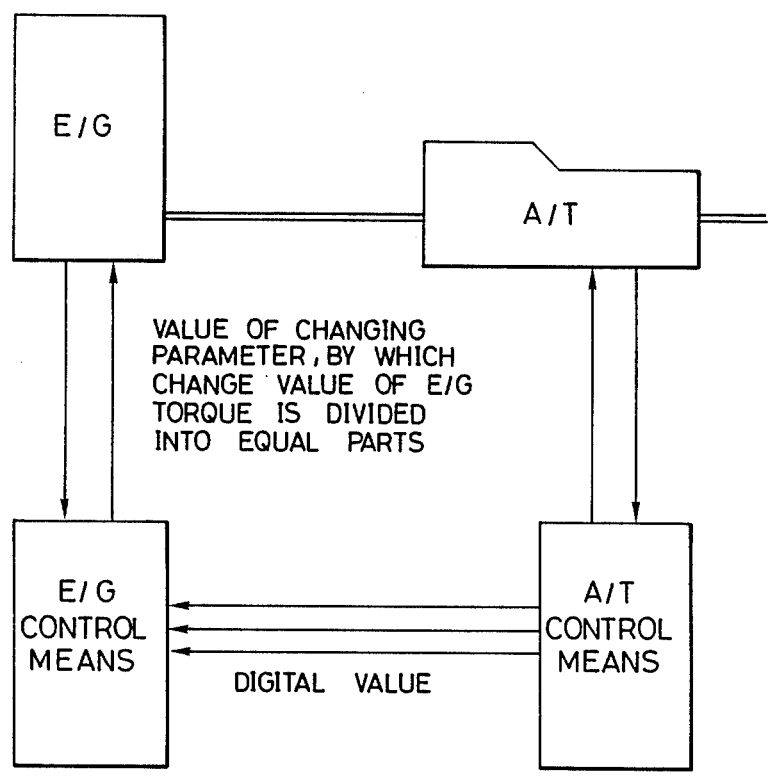
Figure 1D:
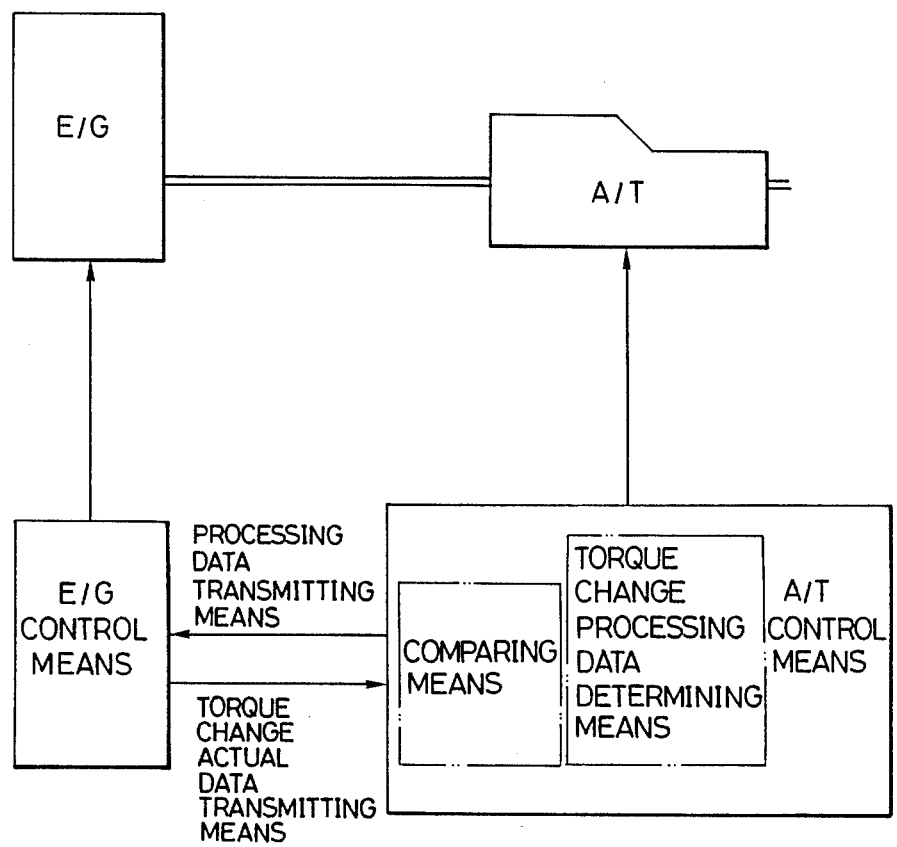
Figure 2:
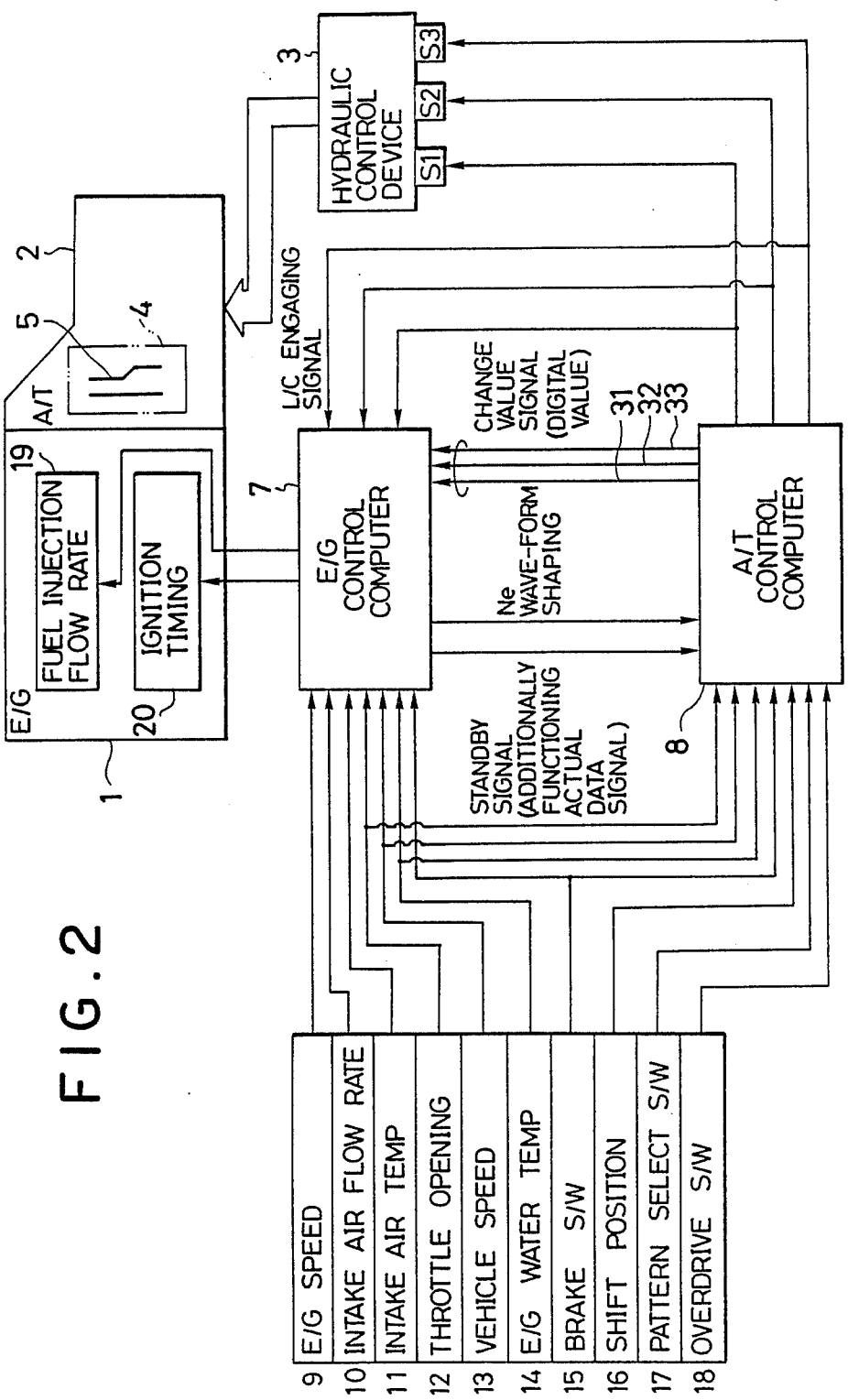
FIG. 2 is a schematic block diagram showing the general arrangement of the system for integrally controlling an automatic transmission and an engine, to which is applied one embodiment of the present invention.

FIG. 2 is a block diagram showing the general arrangement of the system for integrally controlling an automatic transmission and an engine, to which the present invention is applied.

An engine 1 and an automatic transmission 2 are well known in the art. In the engine 1, fuel injection flowrate at an injectos 19 and an ignition timing at a distributor 20 are controlled by an engine control computer 7, so that engine output in accordance with throttle opening and engine rotary speed can be obtained. In the automatic transmission 2, electromagnetic valves S1–S3 are controlled by an automatic transmission control computer 8, and oil lines in a hydraulic pressure control device 3 are controlled whereby the engagements of lockup clutch and frictionally engaging devices are selectively changed, so that a gear stage in accordance with vehicle speed and throttle opening and so-called direct running with lockup clutch can be obtained.

More specifically, the engine control computer 7 receives signals of engine rotary speed from an engine rotary speed sensor (crank angle sensor) 9; intake air flowrate from an air flow meter 10; intake air temperature from an intake air temperature sensor 11; throttle opening from a throttle sensor 12; vehicle speed from an output shaft speed sensor 13; engine water temperature from a water temperature sensor 14; and brake-ON signal from a brake switch 15. The engine control computer 7 determines the fuel injection flowrate and the ignition timing in response to the above-mentioned signals. Torque change value signals (including torque change timing signal information) are parallelly inputted from the automatic transmission control computer 8 through three communication lines 31–33 into this engine control computer 7, whereby the information of torque change timing and change values are taken in the engine control computer from the automatic transmission control computer, to thereby carry out practically the engine torque change control during shifting by the lag angle control.

On the other hand, the automatic transmission control computer 8 receives a signal of a shift lever position from a shift position sensor 16, a signal of a running selection pattern such as the fuel consumption mode or the power performance mode from a pattern select switch 17, a signal of shift permission to an overdriving from an overdrive switch 18 and the like, in addition to signals from the vehicle speed sensor 13, the engine water temperature sensor 14, the brake switch 15 and the like.

A stand-by signal for regulating the lag angle control and a signal obtained by waveform-shaping the engine rotary speed Ne are inputted from the engine control computer 7 into the automatic transmission control computer 8, so that a request for regulating the lag angle control from the engine 1 can be detected.

The above-described three communication lines 31–33 can have eight ($=2\times2\times2$) torque change levels, including the case where the engine torque is not changed (torque down rate is set at 0%). In this embodiment, eight digital values are previously associated with the eight values of the changing parameters (lag angle values) as follows.

Figures 3, 4:
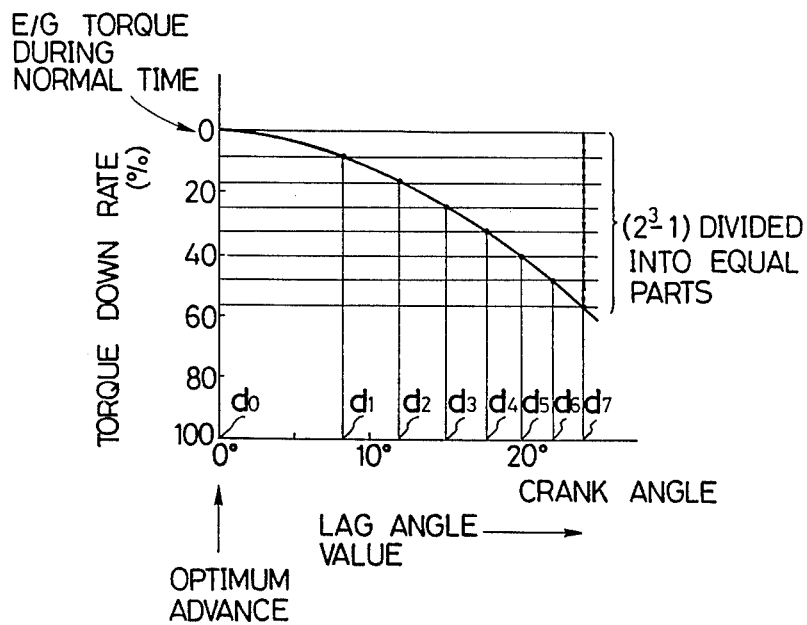
FIG. 3 is a chart showing torque down rates and lag angle values.
FIG. 4 is a chart showing the relationship between sign values of the engine torque change and the lag angle values.

More specifically, as shown in FIG. 3, the engine torque down rate is greater in the case of a large lag angle value than in the case of a small lag angle value (a lag angle of less than 10°). However, it is necessary to increase the engine torque itself smoothly when the engine torque is returned to the normal state from the engine torque down state performing the gradual treatment. If the lag angle values are proportionally associated with the eight change levels (digital values) d0–d7, then the torque change value at the start of return becomes excessively high, so that the smooth return cannot be carried out. Therefore, as shown in FIG. 4, the lag angle values, by which the engine torque change value are divided into equal parts are associated with the eight digital values d0–d7. As a result, when a return command is outputted, if the digital values are successively changed from d7 to d0, then the torque change values can be changed rectilinearly as shown in FIG. 5, thus enabling to perform the gradual treatment smoothly.

Additionally, during return of the engine torque, a time duration T0/6 for maintaining the digital values d0–d7 (or a time duration T0 from d7 to d0) is changed in accordance with the type of shifting, the engine load, the vehicle speed and the like for example, so that a gradient of the gradual treatment can be easily controlled.

Figures 5, 6:
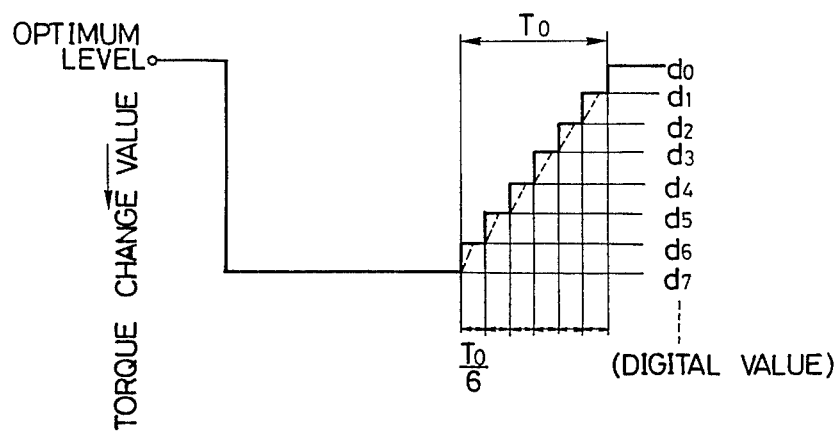
FIG. 5 is a chart showing the relationship between the sign values of the engine torque change and engine torque change values.
FIG. 6 is a chart showing ON-OFF combinations when the sign values of eight levels are transmitted by use of three communication lines.

The combinations of these eight digital values d0–d7 as shown in FIG. 6 are transmitted from the automatic transmission control computer 8 to the engine control computer 7 through the signal lines 31–33.

Here, the reason why the combination of ON-OFF are not associated with the so-called binary system resides in that, when binary systems are adopted, if a specific signal line falls into a trouble, a difference from the digital value to be transmitted is sometimes very large.

Additionally, a more smooth gradual treatment can be obtained when a further gradual treatment is applied per unit time or per turn of engine by the engine control computer 7. More specifically, when the digital values d7, d6, d5 . . . are successively transmitted from the automatic transmission control computer 8, at every predetermined time duration after the digital value d7 is transmitted, lag angle values 24.0°, 23.9°, 23.8° . . . are successively outputted, and after the digital value d6 is transmitted, lag angle values 22.0°, 21.9°, 21.8° . . . are successively outputted, and so on. In this case, the changes in lag angle value are not necessarily proportional to the rate of increase in engine torque, however, this hardly problematical, because this control is performed in fine regions formed between the digital values d7–d6, d6–d5, . . . It is desirable that the gradient of the gradual treatment in the engine control computer 7 during the above-described control is determined to be a function of level of the engine torque change value and of time duration of the gradual time T0. When the above gradual treatment by the engine control computer 7 is additionally adopted, the torque level can be more smoothly controlled as indicated by broken lines in FIG. 5.

Figure 7:
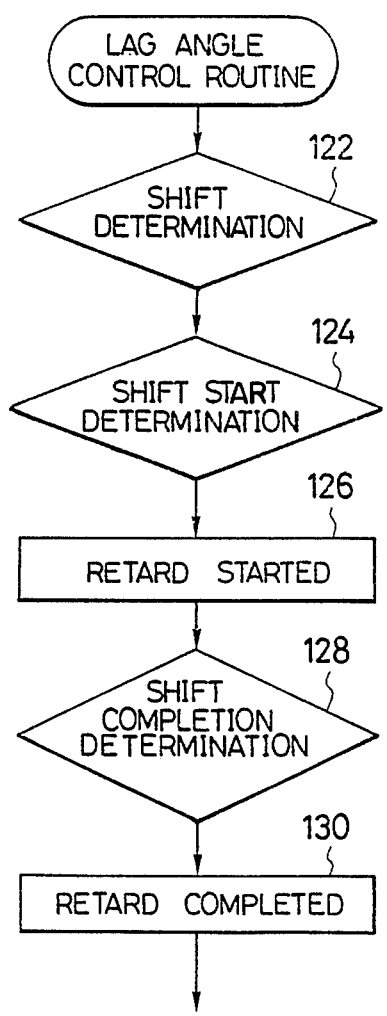
FIG. 7 is a flow chart showing a lag angle control routine used in the above system.

FIG. 7 shows the outline of the lag angle control routine.

In the control routine of the engine control computer 7, an occurrence of shifting is detected from a change in signal of the electromagnetic valves S1–S3 (Step 122), and thereafter, it is detected that a shift has actually started when the engine rotary speed changes (for example, in the case of an up shifting, the engine rotary speed is lowered) (Step 124), the ignition timing is retarded by a lag angle value in accordance with the digital value transmitted from the automatic transmission control computer 8, whereby the engine torque change is carried out (Step 126). In the automatic transmission control computer 8, completion of the shifting is detected when the shifting has progressed and the engine rotary speed Ne is changed up to a rotary speed NeA which is obtained by adding a predetermined value (including a negative number) to an engine rotary speed NeB at the time of completion of the shifting, NeB being determined by an output shaft rotary speed and a gear ratio (Step 128). The automatic transmission control computer 8 outputs each of the digital values with one rank being reduced taking a gradual time T0. The engine control computer 7 performs an engine torque return control accompanied by the gradual treatment in accordance with the already successively transmitted values with one rank being reduced, taking the time T0 (Step 130).

In this case, the lag angle values are varied such that the engine torque change value is divided into equal parts in accordance with the decrease in sign value, so that the gradual treatment can be performed very smoothly.

Figure 8B:
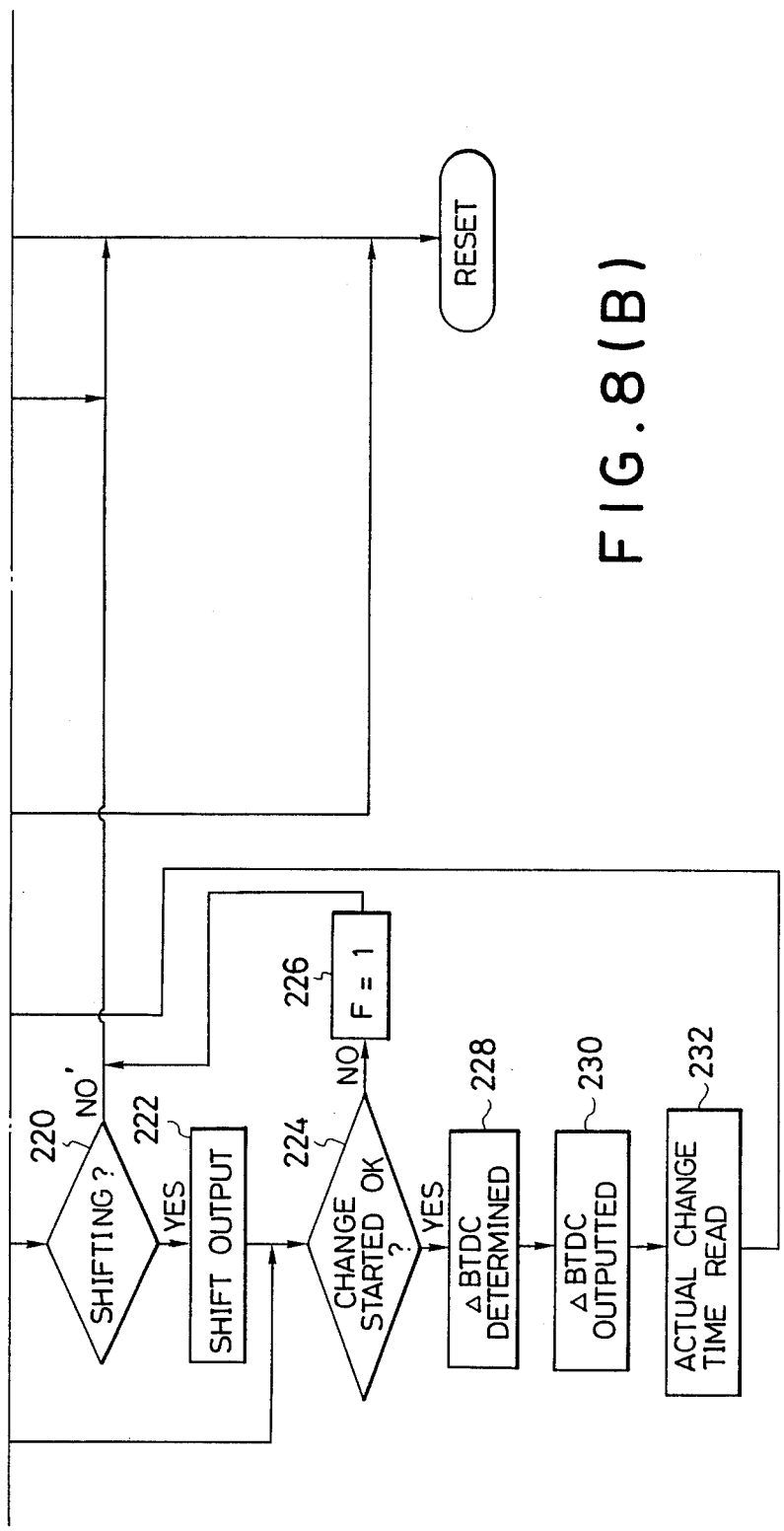

FIGS. 8 and 9 show the specific control flows in the automatic transmission control computer 8 and the engine control computer 7, respectively. The flow charts indicate during up shifting engine power is transmitted to wheels (an accelerator pedal is depressed).

The control flow of the automatic transmission control computer 8 shown in FIG. 8 will be described hereunder. In Step 202, an output shaft rotary speed NO of the automatic transmission and an engine rotary speed Ne are read in. In Step 204, a throttle opening As is read in. In Step 206, a stand-by signal from the engine control computer 7 is read in. Designated at F in Step 208 is a flag used for controlling the flow. Since the flag F is set at 0 initially, the routine proceeds to Step 210.

In Step 210, it is determined whether the engine torque change can be performed or not, i.e., whether the stand-by signal read in in Step 206 in ON or OFF. When it is not a stand-by state, the routine proceeds to Step 212, where a shift point is changed to a slightly lower shift point. In Step 214, a shift determination is made in accordance with the already changed shift point. When it is determined that there is no shifting, the flow is reset. When it is detected that there is a shifting, a shift command relating to this determination is outputted in Step 216, and then, the flow is reset.

The reason why the shift point is changed to a slightly lower one when the torque change is not in the stand-by state, i.e., the torque change is not performed as described above, resides in the following. Namely, since tuning data of the frictionally engaging device in the automatic transmission are determined on the premise that the engine torque is changeable, there is a possibility that excessive load is absorbed by the frictionally engaging devices if a shifting is performed in the state where the engine torque is not changed. If the shift point is changed to the slightly lower one, then the shifting is performed while the vehicle speed is being lowered accordingly, so that the load on the frictionally engaging devices can be decreased.

On the other hand, when a stand-by state is detected in Step 210, the routine proceeds to Step 220, where a shift determination is performed in accordance with a normal shift point. When it is detected that there is shifting, the routine proceeds to Step 222, where a shift command is outputted, and the routine proceeds to Step 224, where a torque change start timing is detected. The torque change start timing is detected by the fact that the engine rotary speed $Ne_i$ at the present time is consecutively lower N times (three times for example) than the engine rotary speed $Ne_{i-1}$ at a preceding time. Until the condition of starting the torque change is established, the flag F is set to 1 in Step 226, thereafter, the flow is reset, whereby the flow is substantially stopped via Step 208. When establishing of the condition of starting the torque change is detected in Step 224, the routine proceeds to Step 228, where a torque change value (ignition timing retard value i.e., lag angle value) $\Delta$ BTDC is determined. The torque change value $\Delta$BTDC thus determined is outputted into the engine control computer 7 in Step 230. Furthermore, in Step 232, information of the actual change time delivered from the engine control computer 7 is read in.

In Step 234, the time of completion of the torque change is detected by the fact that $Ne_i < NO \times iH + N1$ is established for example. Here, iH indicates a gear ratio on the high gear side, N1 is a constant determined by the type of shifting, the vehicle speed, the engine load and the like.

When the time of completion of the torque change is detected in Step 234, the routine proceeds to Step 236, where an engine torque return command is outputted, and the actual return starting time is read in in Step 238.

When the flag F is reset to 0 in Step 240, values between Steps 230 and 232, and between 236 and 238 are discriminated respectively in Step 242. If any one of these values is excessively high, then a warning is outputted in Step 244. Then, the routine proceeds to Step 212, and thereafter, a shifting is determined by a shift point set slightly lower. When the deviation values are below a predetermined value, the flow is reset.

FIG. 9 shows the control flow of the engine control computer 7.

In Steps 302–310, various signals for determining an ignition timing and a fuel injection flow rate are inputted. In Step 312, the torque change value $\Delta$ BTDC outputted from the automatic transmission control computer 8 is read in.

In Step 314, whether the engine torque change is possible or not is detected from the various signals which have been read in in Step 302–310. If the engine torque change is possible, a stand-by signal is outputted into the automatic transmission control computer 8 in Step 316. When it is detected that the torque change should be regulated, Step 316 is bypassed and no stand-by signal is outputted. In Step 314, it is determined that the torque change is impossible when a battery terminal voltage is below a predetermined value, engine cooling water temperature is extremely low or on the contrary extremely high, for example. If the battery voltage is below the predetermined value, then there may be problems in determining torque change processing data and communications thereof, thus the need of regulating the torque change. When the engine cooling water temperature is extremely low, engine misfire may occur when ignition retarding is performed, thus regulating the torque change. When the engine cooling water temperature is extremely high, unusually high temperature may occur in the exhaust system when ignition retarding is performed, thus the need for regulating the torque change.

In Step 318 and 320, an ignition timing BTDC and a fuel injection flow rate are determined by well-known methods, and, in Step 322, the actual ignition timing BTDC is calculated by subtracting the change value $\Delta$BTDC which has been read in Step 312 from this BTDC is larger than 0. When $\Delta$ BTDC is larger than 0, a stand-by signal is operated ON and OFF at high speed in Step 326, and flag F1 is set to 1 in Step 328 and then the flow is reset. When $\Delta$ BTDC is 0, i.e., the torque change is completed, the routine proceeds to Step 330, where it is determined wheter flag F1 is 1 or not. Incidentally, as shown in FIGS. 3 and 4, $\Delta$BTDC is never less than zero. When flag F1 is 1, the high speed ON-OFF operation of the stand-by signal is stopped in Step 332, and flag F1 is reset to 0 in Step 334. As a result, when $\Delta$ BTDC is larger than 0, i.e., only for a period of time, during which the ignition retarding is performed, the stand-by signal is operated ON and OFF at high speed, so that the automatic transmission control computer 8 can be informed of the actual change time in Steps 332 and 338.

Figure 10:
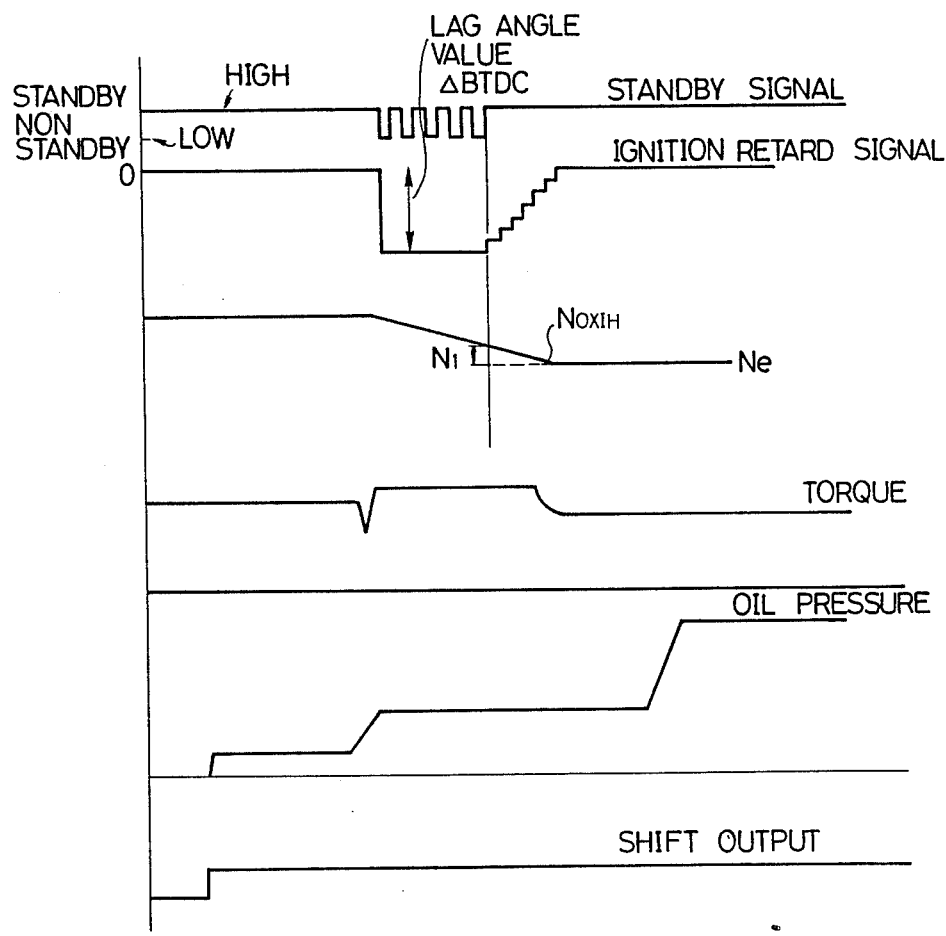
FIG. 10 is a chart showing shift transitional characteristics of the above embodiment.

FIG. 10 shows the shift transitional characteristics of the above embodiment.

The stand-by signal is intended to deliver changes of the engine torque from the engine control computer 7 to the automatic transmission control computer 8, and, here, has an additional function of delivering information of the actual change time of the engine torque. The drawing shows that, because of being on high level prior to a shifting, the stand-by signal indicates the changes of the engine torque. When the condition of starting the engine torque change is established and the automatic transmission control computer 8 delivers a signal of the change value $\Delta$BTDC to the engine control computer 7, upon receiving the signal, the aforesaid stand-by signal repeats the ON-OFF operation at high speed, showing the actual engine torque change being carried out. When the condition of returning the torque is established and the change value $\Delta$BTDC being delivered from the automatic transmission control computer 8 to the engine control computer returns to 0, the stand-by signal stops the ON-OFF repeating operation. The automatic transmission control computer 8 compares values between the command signals and the stand-by signal in Steps 230–232 and Steps 236–238, respectively, and when a value of deviation is excessively high, the automatic transmission control computer 8 outputs a warning and changes a shift point to a slightly lower one, thus preventing the decrease in durability of the frictionally engaging devices. Return of the engine torque is carried out such that the change value $\Delta$ BTDC is slowly reduced to the zero level by the automatic transmission control computer 8. As described above, in this embodiment, the engine torque change signals are transmitted by the three communication lines, so that the engine torque change value can be selected into eight levels including the zero level. Furthermore, as for the returning characteristics (characteristics of gradual treatment), the time duration to be maintained for the respective levels can be controlled to adjust the returning characteristics.

Additionally, in this embodiment, in order to change the engine torque, the means for retarding the ignition timing (lag angle control) is adopted, and accordingly, the lag angle value has been adopted as a changing parameter, however, as described above, the present invention does not limit the specific means for changing the engine torque. For example, as in generally known, if a fuel injection rate, an exhaust gas value in a variable exhaust gas value control, or a supercharge value in a variable supercharge pressure control is varied, then engine torque is changed.

What is claimed is:

1. A system for integrally controlling an automatic transmission and an engine, comprising:
   means for controlling said engine;
   means formed separately from said engine control means for controlling said automatic transmission;
   means formed integrally with said automatic transmission control means for determining data for torque change control of said engine, said engine torque change control data including a value for a change in engine torque and a duration for the change in engine torque;
   means for associating values of parameters for changing engine torque, by which the engine torque change value is divided into equal parts with a plurality of digital values; and
   means for transmitting said digital values from said automatic transmission control means to said engine control means so as to perform the engine torque change.

2. The system as set forth in claim 1, wherein said changing parameter is an ignition timing retard value.

3. The system as set forth in claim 1, wherein said changing parameter is a fuel injection flow rate.

4. The system as set forth in claim 1, wherein said changing parameter is an exhaust gas amount in a variable exhaust gas amount control.

5. The system as set forth in claim 1, wherein said changing parameter is a supercharge pressure in a variable supercharge pressure control.

6. The system as set forth in claim 1, wherein a time duration for maintaining said plurality of digital values is varied to thereby control the characteristics of gradual treatment of said torque change.

7. A system for integrally controlling an automatic transmission and engine, comprising:
   means for controlling said engine;
   means formed separatedly from said engine control means for controlling said automatic transmission;
   means formed integrally with said automatic transmission control means for determining data for torque change control of said engine, said engine torque change control data including a value of a change in engine torque and a duration for the change in engine torque;

means for transmitting information of said data for said engine torque change control to said engine control means;

means formed integrally with said engine control means, for detecting whether the engine torque change can be performed in the present driving environment; and transmitting means for indicating that said data for engine torque change control should be determined under the regulation of said automatic transmission control means when said engine torque change cannot be performed in the present driving environment.

8. The system as set forth in claim 7, wherein a torque change value as one of the data to be determined under regulation is zero.

9. A system for integrally controlling an automatic transmission and an engine, comprising:

means for controlling said engine;

means formed separately from said engine control means for controlling said automatic transmission;

means formed integrally with said automatic transmission control means for determining data for torque change control of said engine, said engine torque change control data including a value of a change in engine torque and a duration for the change in engine torque;

means for tansmitting information of the data for the engine torque change control to said engine control means;

means for transmitting actual data of the torque change actually performed by said engine control means, to said automatic transmission control means; and means for comparing information of said data for the engine torque change control determined by said automatic transmission control means, with said actual data actually performed.

* * * * *